US005287287A

United States Patent [19]

Chamberlain et al.

[11] Patent Number: 5,287,287

[45] Date of Patent: Feb. 15, 1994

[54] POWER CONSUMPTION RATE DISPLAY DEVICE

[75] Inventors: Edward N. Chamberlain, Racine; Mark Grossmeyer, Cedarburg, both of Wis.

[73] Assignee: Energy Audit Corporation, Racine, Wis.

[21] Appl. No.: 582,676

[22] Filed: Sep. 14, 1990

[51] Int. Cl.$^5$ .................. G06F 15/20

[52] U.S. Cl. .................. 364/483; 345/35

[58] Field of Search .................. 364/483, 464.04, 492; 340/753, 754, 716; 324/95

[56] References Cited

U.S. PATENT DOCUMENTS

| | | | |
|---|---|---|---|
| D. 195,406 | 6/1963 | Romine | D26/13 |
| D. 245,321 | 8/1977 | Skyer et al. | D10/102 |
| D. 255,563 | 6/1980 | Brooksby et al. | D13/32 |
| D. 262,261 | 12/1981 | Schumacher et al. | D8/353 |
| D. 268,030 | 2/1983 | Ault | D14/115 |
| D. 270,725 | 9/1983 | Fenne | D13/12 |
| D. 272,436 | 1/1984 | Trabucchi et al. | D13/35 |
| D. 280,406 | 9/1985 | Walker | D14/100 |
| D. 287,575 | 1/1987 | Newton | D10/81 |
| D. 297,419 | 8/1988 | Bonnema | D10/50 |
| D. 300,122 | 3/1989 | Grudzien, Jr. | D10/60 |
| D. 300,140 | 3/1989 | Cain | D14/115 |
| D. 301,312 | 5/1989 | Edmondson | D10/81 |
| D. 306,288 | 2/1990 | Hsiao et al. | D14/115 |
| 4,120,031 | 10/1978 | Kincheloe et al. | 364/483 |
| 4,399,510 | 8/1983 | Hicks | 364/483 |
| 4,442,492 | 4/1984 | Karlsson et al. | 364/464.04 |
| 4,630,211 | 12/1986 | Pettis | 364/464.04 |
| 4,656,874 | 4/1987 | Kulig | 73/861.55 |
| 4,716,409 | 12/1987 | Hart et al. | 340/825.22 |
| 4,751,495 | 2/1990 | Whitman | 340/310 R |
| 4,803,632 | 2/1989 | Frew et al. | 364/464.04 |
| 4,899,131 | 6/1988 | Wilk | 340/518 |

*Primary Examiner*—Jack B. Harvey
*Assistant Examiner*—Ellis B. Ramirez
*Attorney, Agent, or Firm*—Nilles & Nilles

[57] ABSTRACT

A device for displaying power consumption rates includes a register for storing and displaying the cost of a unit of power, e.g., the cost per kilowatt hour as assessed by the local power company. A first display indicates the cost of power consumed over a first time period (such as an hour) based upon the then-existing instantaneous rate of power use. A second display indicates the cost of power projected to be consumed over a second time period such as a day, assuming that the then-existing instantaneous rate of power usage is maintained. A third display indicates the cost of power projected to be consumed over a third time period such as 30 days while fourth, fifth and sixth displays provide the instantaneous rate at which power is being consumed as well as totalized actual costs over two different time periods. A register is equipped with structure for adjustment whereby the cost stored in the register of a unit of power may be changed. The information displayed by the device may thereby be kept current and accurate even though electrical rates may change. The front panel of the device is "human engineered" for easy readability and first presentation of the most important information.

21 Claims, 11 Drawing Sheets

POWER CONSUMPTION RATE DISPLAY DEVICE

FIELD OF THE INVENTION

This invention is related generally to display devices and, more particularly, to a device which displays electrical power consumption rates and certain cost information for each of several different periods of time.

BACKGROUND OF THE INVENTION

While electrical power has been generally available in quantities to meet the needs of homeowners, business and industry, costs relating to the generation of such power have increased at a significant rate. Over the last decade or two, there has been a growing awareness that for adequate quantities of power to be available over the long term, consumers of such power must be attentive to and practice ways to reduce electrical power consumption.

The most dramatic and direct way in which such a consumer might be made aware of the need to conserve power is by being aware of the cost of power consumption. As the actual and projected costs of electrical power consumption increase, a consumer who becomes aware of such increases will naturally have an incentive to moderate consumption and eliminate needless uses of such power.

Whitman U.S. Pat. No. 4,751,495 (issued Jun. 14, 1988) shows a device used to detect and display the temperatures of several heat trace elements Although the Whitman device displays a parameter, temperature, which may arguably be related to electrical consumption, there is no indication that such device has the capability of displaying electrical power consumption rates or, for that matter, the cost of power being consumed.

Other patents which seem more directly related to a power consumption rate display device include Bonnema et al. U.S. Pat. No. D297,419 (issued Aug. 30, 1988), Trabucchi et al. U.S. Pat. No. D272,436 (issued Jan. 31, 1984) and Ault U.S. Pat. No. D268,030 (issued Feb. 22, 1983). The arrangements of the front panels shown in the foregoing patents fail to appreciate the importance of certain factors which bear on the arrangement of a panel layout.

Specifically, the arrangements in the Ault and Trabucchi et al. patents do not adequately recognize that many persons assimilate displayed information better if it can be "read" in a few, longer horizontal sweeps of the eyes rather than in a larger number of short, "choppy," vertically spaced sweeps. In addition, the arrangements illustrated in such patents do not adequately consider that multiple items of displayed information are better and more quickly understood if the displays are well spaced from one other rather than being crowded together. The latter can result in what might be termed "eye confusion."

In addition, none of the foregoing patents disclose a power consumption rate display device which detects voltage and current parameters in a building and which uses such parameters (as well as others) in a display device to compute and display various actual and projected cost figures. An improved power consumption rate display device which has a panel display "human engineered" for easy reading and adjustment and which permits a user to ascertain the actual and projected costs of consumed electrical power over various periods of time would be an important advance in the art.

OBJECTS OF THE INVENTION

It is an object of this invention to overcome some of the problems and shortcomings of the prior art.

Another object of this invention is to provide an improved power consumption rate display device having a plurality of displays for indicating the cost of power consumed and projected to be consumed over various time periods.

Another object of this invention is to provide an improved power consumption rate display device which provides projected costs of power consumed over several different time periods such as one hour, one day, and 30 days.

Another object of this invention is to provide an improved power consumption rate display device which indicates the instantaneous rate at which kilowatts of electricity are being used.

Another object of this invention is to provide a power consumption rate display device which permits a user to determine the actual total cost of power consumed during certain previous time periods such as, for example, the previous day and the previous 30 days.

These and other important objects will be apparent from the descriptions of this invention which follow.

SUMMARY OF THE INVENTION

The improved power consumption rate display device has a front display panel which is "human engineered" for easy readability and understanding by the consumer. Its arrangement presents more important information first, other information second and spatially segregates from other displays that display which is used only infrequently and which presents information less meaningful to the consumer.

The improved device for displaying power consumption rates is constructed in either a multiplexed or a non-multiplexed embodiment using readily available electronic components. The device is appropriately coupled to the electrical service entrance to the building and uses detected voltage and current parameters, along with power cost information entered by the consumer, to compute and display actual and projected costs over several different periods of time.

In general, the device includes a display for displaying the cost of a unit of power, e.g., the cost per kilowatt hour as assessed by the local power company. A first display indicates the cost of power consumed over a first time period (such as an hour) based upon the then-existing instantaneous rate of power use. A second display indicates the cost of power projected to be consumed over a second time period such as a day, assuming that the then-existing instantaneous rate of power usage is maintained.

A third display indicates the cost of power projected to be consumed over a third time period such as 30 days and likewise assumes that the instantaneous rate of usage will continue. A fourth display is provided for displaying the instantaneous rate, preferably in kilowatts, at which power is being consumed. The device thereby displays information relating to the rate and to the actual unprojected costs of power consumption.

The register is equipped with means for adjustment whereby the cost stored in the register of a unit of power may be changed. The information displayed by the device may thereby be kept current and accurate even though electrical rates may change.

The device provides much useful information using the aforementioned register and four displays. However, the availability of additional information will be of further benefit to the consumer in understanding how affects out-of-pocket costs. Therefore, in a highly preferred embodiment, the device also includes a fifth display and a sixth display for indicating the actual total cost of power consumed during a second time period and a third time period, respectively. These time periods may desirably be selected to be one day and 30 days, respectively.

The utility of the device is further improved when it incorporates a "look back" feature which permits the consumer to obtain certain historical cost information. Such information helps inform the consumer of the effect of conservation measures or, equally important, of the effect of extravagant power use.

Accordingly, the preferred device also includes means for causing the display of the actual total cost of power consumed during the immediately preceding second time period and third time period such as the immediately preceding day and 30 day period, respectively. Such display is accomplished by using a button or switch which causes the display of the previous totals when actuated.

While the display of the foregoing information will unquestionably be useful to a consumer of power (and will likely result in a reduced rate of power consumption), it is important that the available information be displayed in a manner which recognizes certain inherent human traits. One such trait (at least for readers of most languages) is to read a display from left to right in longer, horizontal sweeps of the eyes. Another such trait is to first read the topmost row or line of a display and then proceed downward line by line.

Yet another such trait is that for many persons, multiple items of displayed information are better and more quickly understood if the displays are well spaced from one other. It is also helpful if a display of information which changes only infrequently and is of only periodic interest is "set aside" or slightly removed from the main viewing area. Such an arrangement helps avoid detracting from quick assimilation of the most necessary and meaningful information.

Accordingly, a highly preferred embodiment of the power consumption rate display device has a front panel with top, bottom, left and right edges. The first, second and third displays are arranged in a first horizontal row near the upper edge of the front panel since these displays will likely be of greatest interest to the user. Such positioning will cause such displays to be visually encountered first. The fourth, fifth and sixth displays are arranged in a second horizontal row which is positioned near the bottom edge. Such displays, being of somewhat lesser interest, thereby occupy a position of second viewing when the front panel is visually scanned by a user of the device.

It is to be appreciated that the inventive device continuously displays a great deal of information without the need to manipulate buttons. Yet additional information is available by depressing only a few buttons.

Since the displayed register information (cost per kilowatt hour) changes very infrequently and since such information has less meaning to the user than directly indicated cost information, the display is preferably positioned on the front panel at a location separate from the first row and the second row. The electrical circuitry and program flow chart relating to the display device are set forth below.

DETAILED DESCRIPTION OF PREFERRED EMBODIMENTS

The figures show the improved power consumption rate display device 10 in accordance with the invention.

Figure 1:
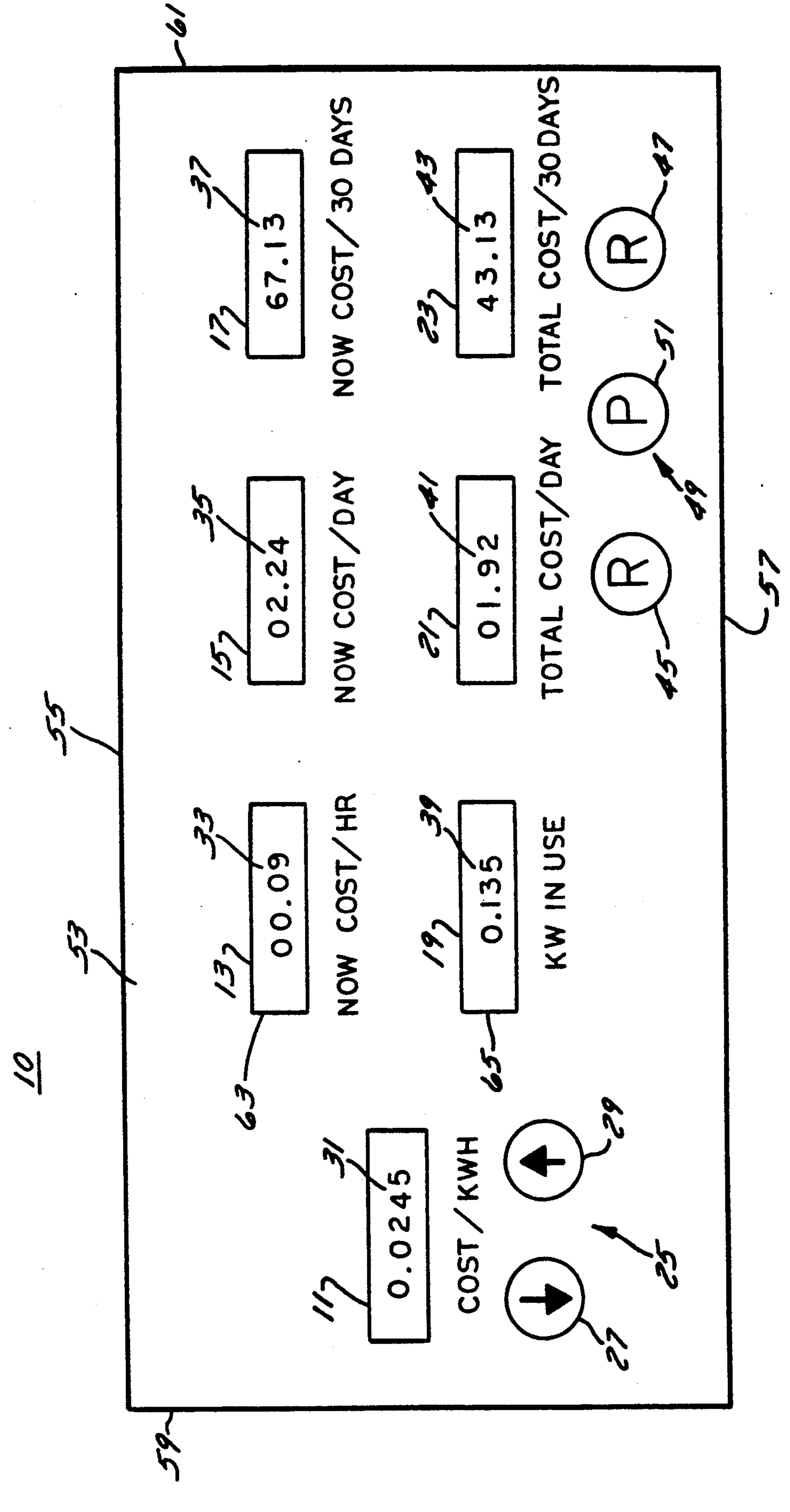
FIG. 1 is a front elevation view of the front panel of the power consumption rate display device.

Referring first to FIG. 1, the power consumption rate display device 10 includes in addition to display 11, a first display 13, a second display 15, a third display 17, a fourth display 19, a fifth display 21 and a sixth display 23. The functions of the register 11 and the displays 13, 15, 17, 19, 21, 23 will be described in turn.

The display 11 displays the cost of a unit of electrical power such as the cost per kilowatt hour stored in a register forming part of the memory circuit 79 described below. Means 25 for changing the cost data stored therein is embodied as a pair of push buttons 27, 29 arranged side by side adjacent the register. When depressed, the first button 27 reduces the displayed value while depression of the second button 29 increases the displayed value. By using the buttons 27, 29, the actual cost per kilowatt hour of electricity can be entered by the consumer and subsequently changed as power rates change.

The first display 13 indicates the cost of power consumed over a first time period as, for example, over an hour. This cost per hour is calculated using the value 31 entered in the register for display 11 and using the measured value of kilowatts then being consumed. The value 33 indicated in the first display 13 is computed and updated on the assumption that the then-existing instantaneous rate of power consumption will persist over the next 60 minutes. Therefore, the displayed value 33 will change with changes in equipment usage and resulting power consumption.

The first display 13 (as well as other displays 15, 17, 19, 21, 23 described below) provides an immediate visual indication that a power consuming device (a flat iron or electric griddle, for example) may have inadvertently been left on. Experience in use of the device will inform the user as to what constitutes typical and unusual rates of power consumption.

The second display 15 indicates the cost of power projected to be consumed over a second time period such as a day. As with the first display 13, the value 35 appearing in the second display 15 is computed and updated on the assumption that the then-existing rate of power consumption will persist over the next 24 hours.

The third display 17 indicates the cost of power projected to be consumed over a third period, 30 days for example, and the value 37 indicated thereon is computed based on the foregoing assumption of persistence of the then-existing rate. Any one of the foregoing displays 13, 15, 17 will provide highly valuable information to the user. However, when such displays 13, 15, 17 are viewed in sequence from left to right, the values 33, 35, 37 indicated thereon dramatically increase. That is, the cost value 35 shown in the second display 15 will nominally be 24 times that shown in the first display 13. Similarly, the cost value 37 shown in the third display 17 will nominally be 30 times that shown in the second display 15.

This has the psychological effect of heightening the awareness of the consumer as to the cost of power (assuming existing usage rates persist) and also to the need to take steps to conserve power and shut off selected appliances, if possible.

The fourth display 19 indicates the instantaneous rate 39, preferably in kilowatts, at which power is being consumed. Such information is of value to the user at least insofar as the displayed rate 39 changes, especially if it changes dramatically upward. This information coupled with changes in the dollars-and-cents information appearing on other displays 13, 15, 17 will provide a basis for making a mental correlation between kilowatts of power being used and the cost thereof.

The fifth display 21 and the sixth display 23 provide totalized information, i.e., the actual, running total cost of power consumed during the second time period and the third time period, an exemplary day and 30 day period. These costs are identified as values 41, 43, respectively. At the end of each 24 hour day, the total cost per day is saved in what may be called a previous total cost per day register (part of the memory circuit 79 described below), the fifth display 21 is zeroed or reset and the cycle is repeated. Similarly, the value 43 aggregated and shown on the sixth display 23 is saved in a previous total cost per 30 day register, the display 23 is then reset and the 30 day cycle is repeated.

This saving and reset activity is performed automatically. Reset may also be initiated by depressing the buttons 45 and 47 (for the displays 21 and 23, respectively). In either instance, totalization and "saving" will occur automatically for each indicated time (e.g., one day or 30 days) irrespective of whether initiated automatically or by depressing a button 45 or 47.

From the foregoing, it is to be appreciated that the first through fourth displays 13, 15, 17, 19, if used alone in the device 10, will provide a great deal of meaningful information. However, the inclusion of the fifth and sixth displays 21, 23 provide monetary values 41, 43 which may make a more significant psychological impact upon the user because of their relatively larger magnitude. Such features also permit comparisons to be made and thereby further encourage conservation measures.

The utility of the device 10 is further enhanced by the inclusion of means 49 for causing the display of the actual total cost of power consumed during the immediately preceding day and 30 day periods. Such means 49 is embodied as a "previous totals" button 51 which, when depressed, causes the total cost of power consumed during the immediately preceding 24 hour and 30 day period to be displayed upon the fifth display 21 and the sixth display 23, respectively. Such capability permits the user to ascertain with a fair degree of accuracy whether or not power consumption costs over a period of time are increasing or decreasing and more specifically, whether and to what extent conservation efforts are effective.

From the foregoing, it should be appreciated that the selected time periods need not be 1 hour, 1 day or 30 days. However, greatest utility is realized when the second time period is an integer multiple of the first time period and the third time period is an integer multiple of the second time period.

It will also be appreciated that any one of a wide variety of arrangements of the displays 13, 15, 17, 19, 21, 23 and buttons 27, 29, 45, 47 would be fully functional. However, a highly preferred device 10 recognizes the way in which the user is accustomed to reading, i.e., from left to right and from top down for most languages. Such arrangement also recognizes certain psychological factors. Accordingly, a highly preferred power consumption rate display device 10 has a front panel 53 with a top edge 55, a bottom edge 57, a left edge 59 and a right edge 61. The first display 13, second display 15 and third display 17 are arranged in a first horizontal row 63 which is located near the top edge 55 and generally adjacent the right edge 61.

This first horizontal row 63 thereby occupies a position of first viewing when the front panel 53 is visually scanned. This is so since the user will in all likelihood be accustomed to reading from left to right and from top down. The first display 13, the second display 15 and the third display 17 are selected for inclusion in the first horizontal row 63 since such displays 13, 15, 17 convey that information which is believed to be of first importance to the user.

The fourth display 19, fifth display 21 and sixth display 23 are arranged sequentially in a second horizontal row 65 which is positioned near the bottom edge 57 and generally adjacent the right edge 61. While the information conveyed by the fourth, fifth and sixth displays 19, 21, 23 is important to a user, it is somewhat secondarily so as compared to that conveyed by the displays 13, 15, 17. Therefore, such displays 19, 21, 23 are placed in the second horizontal row 65 to occupy a position of second viewing when the front panel 53 is visually scanned. It is also to be noted that the key displays 13, 15, 17, 19, 21, 23 are arranged in two, relatively long horizontal rows 63, 65 rather than in several short, vertically spaced rows. Such an arrangement seems more "comfortable" for most users of the device 10.

The display 11—which displays cost per kilowatt hour information—is infrequently adjusted and in any event means relatively little per se to most consumers. More important components of information relate to actual out-of-pocket costs of electrical power consumed. Of course, such information requires that the cost per kilowatt hour be properly combined with kilowatts of use to obtain monetary information. Therefore, the display 11 and the associated buttons 27, 29 are set aside near the left edge 59 of the panel 53 and at a location which is generally vertically midway between the first row 63 and the second row 65. When so positioned, the display 11 is less likely to catch the eye of the user since there is little point in looking at the display 11 each time a row 63 or 65 is visually scanned. However, it is readily accessible in the event of a change in the rate cost of electrical power.

Figure 2:
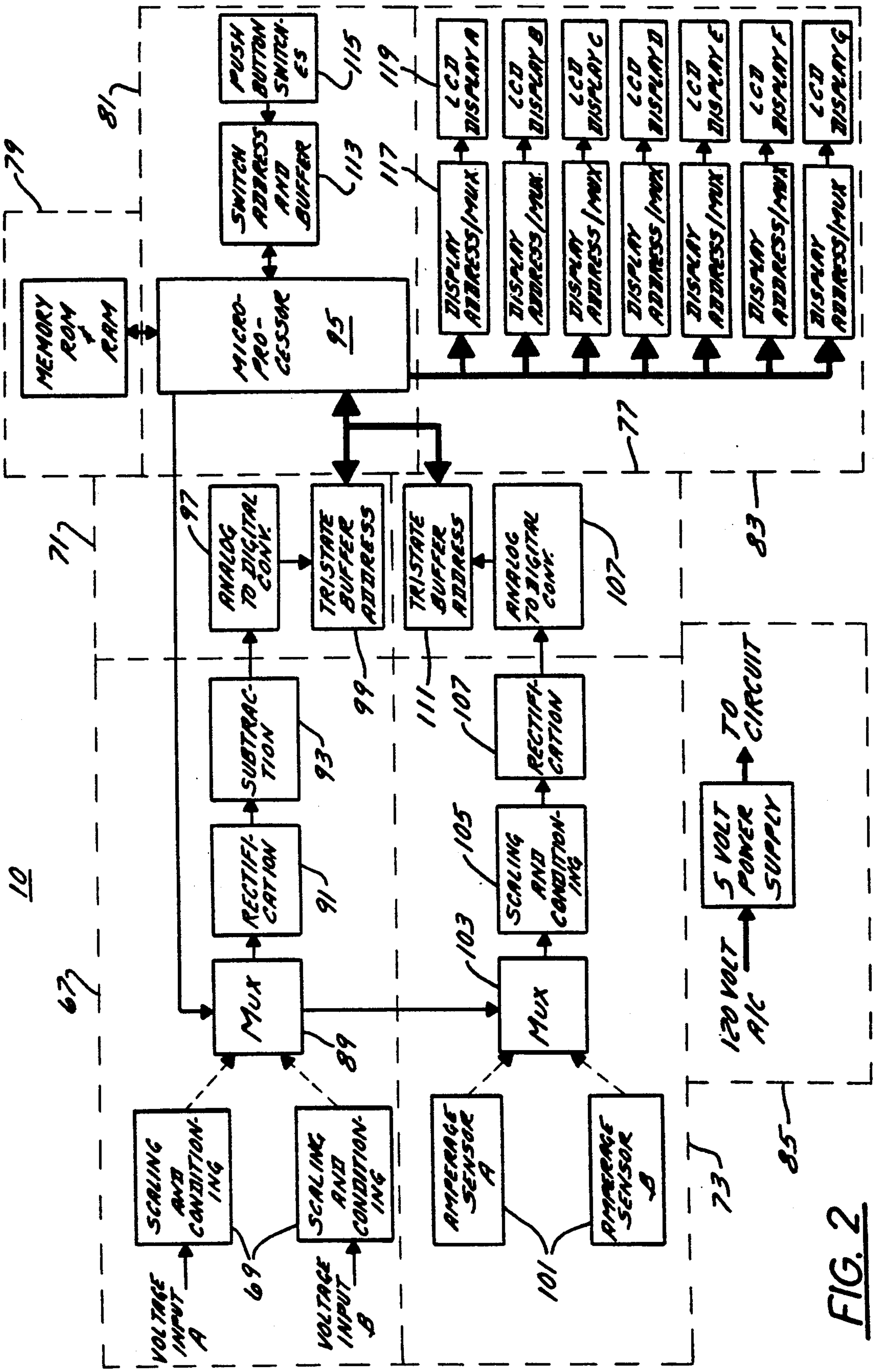
FIG. 2 is a block circuit diagram of the first embodiment of the display device.

Referring next to FIG. 2, the circuit block diagram of the first or multiplexed version of the device 10 will now be described. The device 10 includes a voltage output circuit 67 which provides a signal representing a detected voltage such as the line voltage at the building service entrance. The circuit 69 has two voltage inputs or pickups 69, one each for detecting voltage between one of the building hot lines and neutral. A voltage conversion circuit 71 receives the detected voltage signal in analog form and responsively provides a representative digital voltage signal.

The device 10 also includes a current output circuit 73 for providing a signal representing a detected current such as the current flowing in each of the hot service entrance lines. The circuit 73 has two current sensors 75, one for each hot line. A current conversion circuit 77 receives the detected current signal in analog form and responsively provides a representative digital current signal. The memory circuit 79 retains the operating program as well as process variables including the representative digital voltage signal and digital current signal.

A microprocessing circuit 81 is connected to the memory circuit 79 and to a display circuit 83. This circuit 81 receives the digital voltage and current signals and generates response signals which are directed to the display circuit 83. The device 10 thereby displays information relating to the rate and to the actual and projected costs of power consumption. A 120 volt AC/5 volt DC power supply 85 is connected to the circuits 67, 71, 73, 77, 79, 81, 83 in a known manner for providing operating power.

In a highly preferred embodiment, the voltage output circuit 67 includes voltage scaling and conditioning circuits 87, a multiplexer 89, a rectification section 91 and a substraction section 93. The detected voltage(s) are scaled by a resistive voltage divider network or by a transformer so that the scaled voltage value is proportional to but smaller than the value of the voltage detected. If scaling is accomplished close to the service entrance, low voltage wiring may be used between that portion of the device 10 at the service entrance and that portion which is mounted behind the panel 53.

Under the control of the microprocessor 95, the multiplexer 89 transmits one of the two sensed voltages to the rectifying section 91 which changes it from AC to DC, full or half wave rectification, using diodes or operational amplifiers and a smoothing low pass filter.

In a home, the typical range of the detected voltage will be from a minimum anticipated value of about 110 volts to a maximum of about 130 volts. In view of that fact, the subtraction section 93 "deducts" a constant, e.g., 110 volts, from the sensed signal using a differential operational amplifier. Then the full range of resolution is 110 volts to 130 volts, i.e., 20 volts instead of a gross 130 volts. Accuracy will thereby be aided.

The output of the substraction section 93 is directed to the analog-to-digital converter 97 of the voltage conversion section 71 which changes the analog voltage into a representative digital voltage signal. Such conversion can be accomplished using a dedicated integrated circuit or a single chip digital volt meter. The output of the converter 97 is stored in a tri-state buffer 99 for later selection by the microprocessor 95.

Detection of current is performed generally similarly. A line current is sensed using an inductive current probe 101, the output of which is an alternating current which is smaller than but proportional to the current flowing in the line. These smaller current signals are sequentially transmitted by a multiplexer 103 to the scaling and conditioning section 105, the rectification section 107 and thence to the analog-to-digital converter 109. The representative digital current signal is then stored in a tri-state buffer 111 for selective use by the microprocessor 95.

The memory section 79 includes both ROM and RAM memory, the former storing the program executed by the microprocessor 95 and the latter incorporating the register storing temporary variables. Either or both the ROM or RAM memory may be built into the microprocessor 95. The switch address and buffer section 113 and the switch section 115 allow the microprocessor 95 to "read" the open or closed state of the push buttons 27, 29, 45, 47. The display address and multiplexer sections 117 and the liquid crystal display sections 119 enable the display of numerical information, whether in cents, dollars and cents or kilowatts. Such arrangement permits the microprocessor 95 to sequentially select displays 13, 15, 17, 19, 21, 23 and the related multiplexer transmits an appropriate value to one of the four digits comprising each display. These sections 117 also include latches which retain the display values 33, 35, 37, 41, 43 and rate 39 until replaced with a different value by the microprocessor 95.

Figure 3:
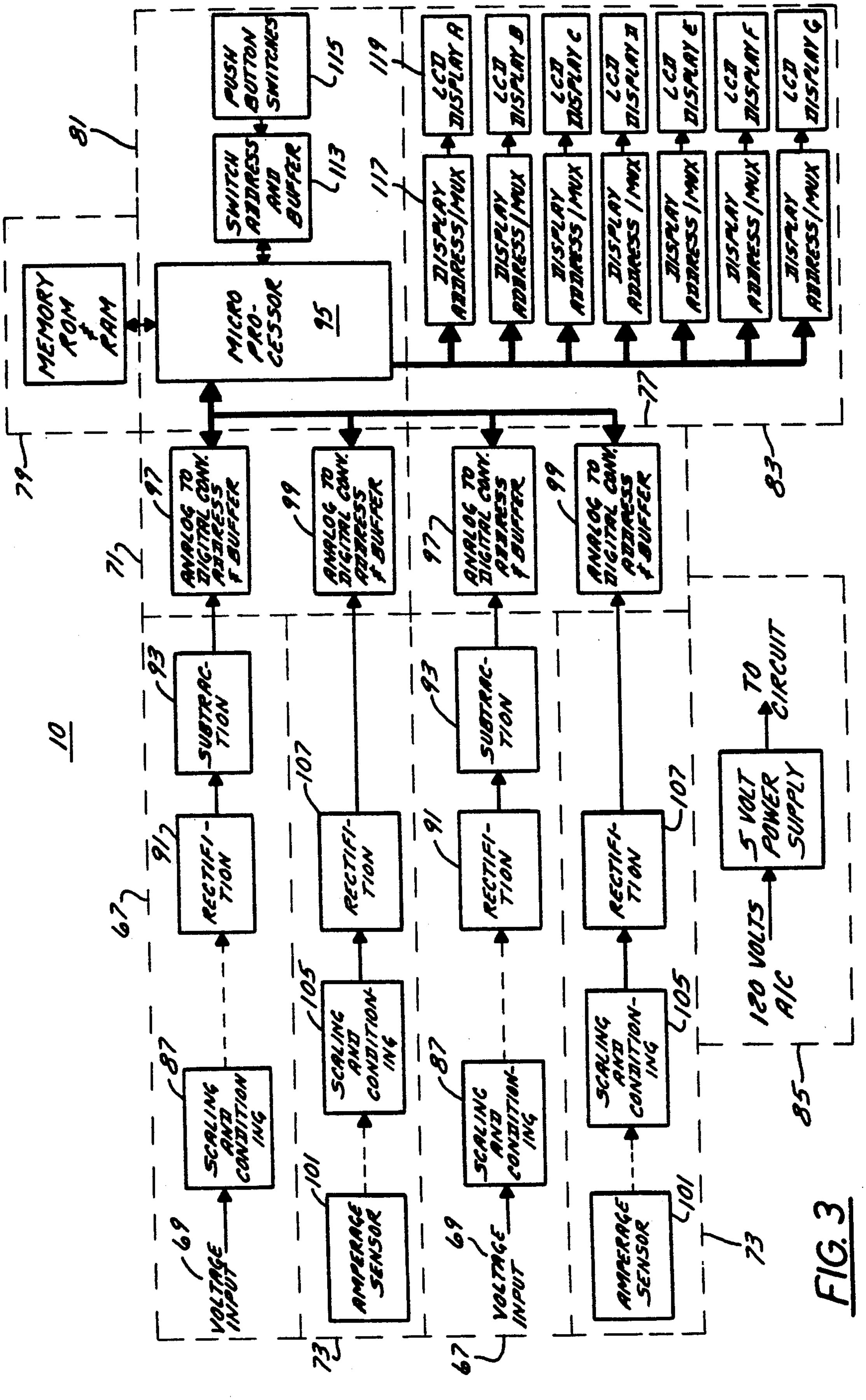
FIG. 3 is a block circuit diagram of a second embodiment of the display device.
Figure 4:
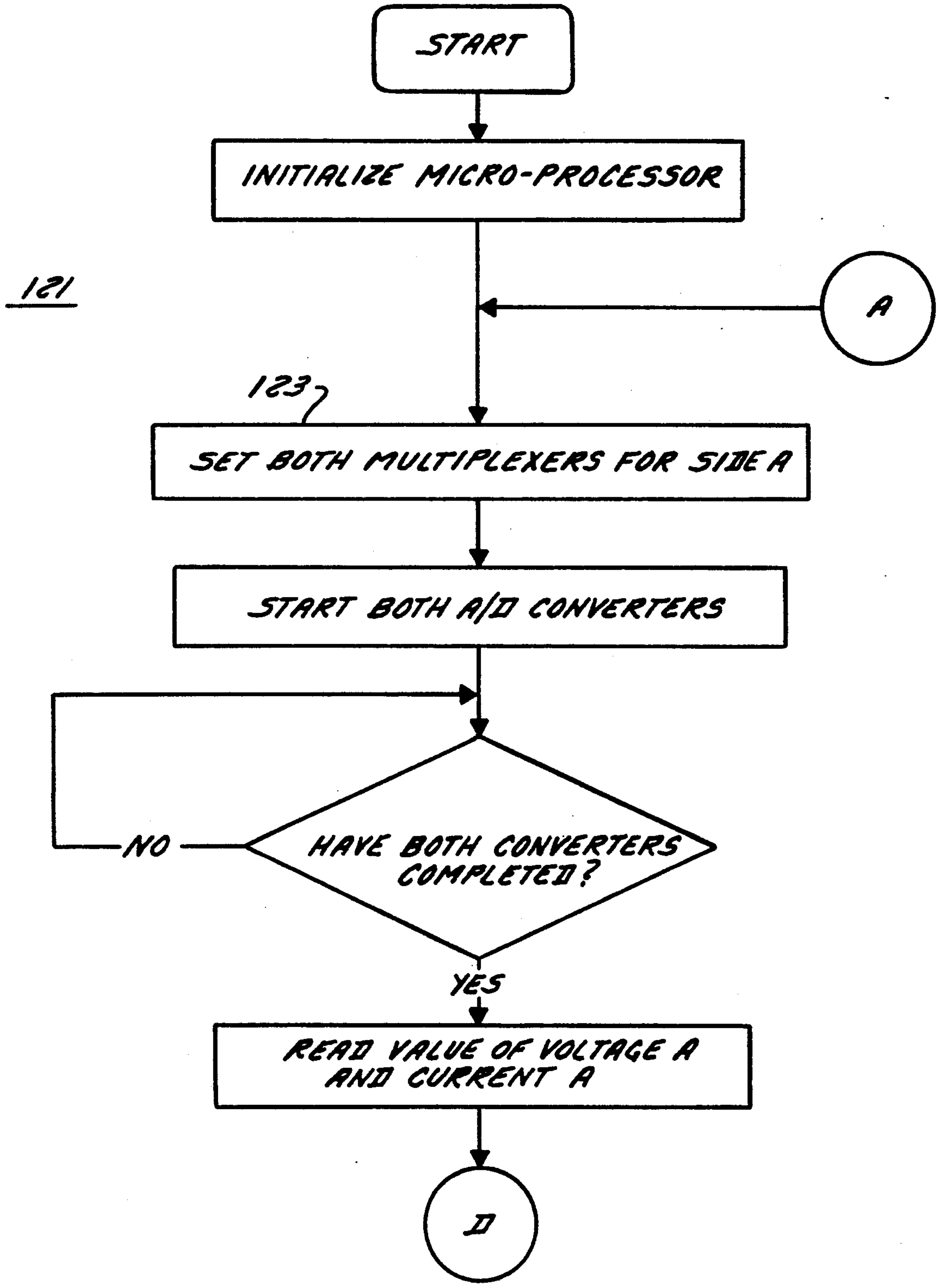
FIGS. 4, 5, 6, 7, 8, 9, 10 and 11 comprise the program flow chart, in FIGURE sequence, illustrating the primary operations of the microprocessor used in the display device.
Figure 5:
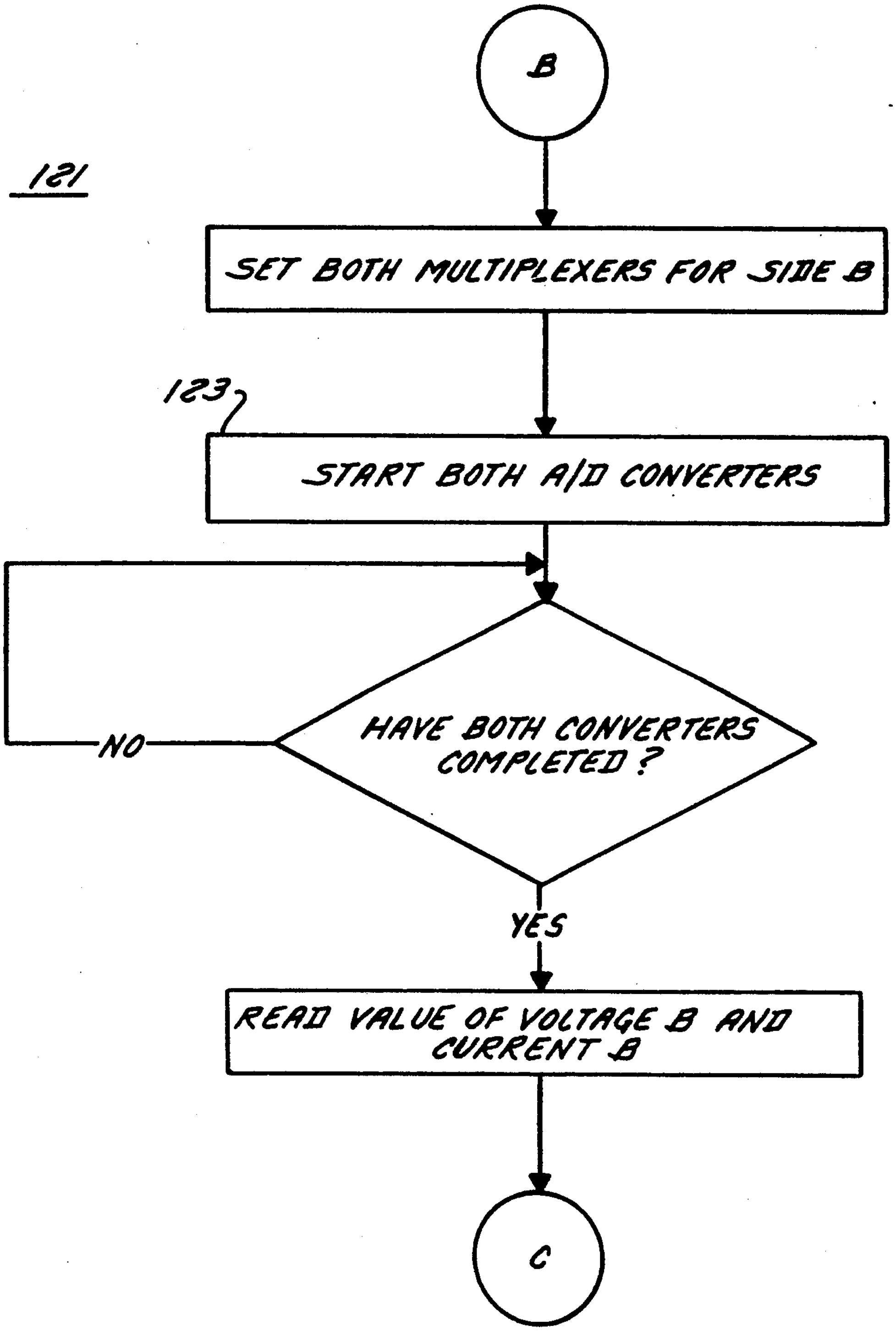
Figure 6:
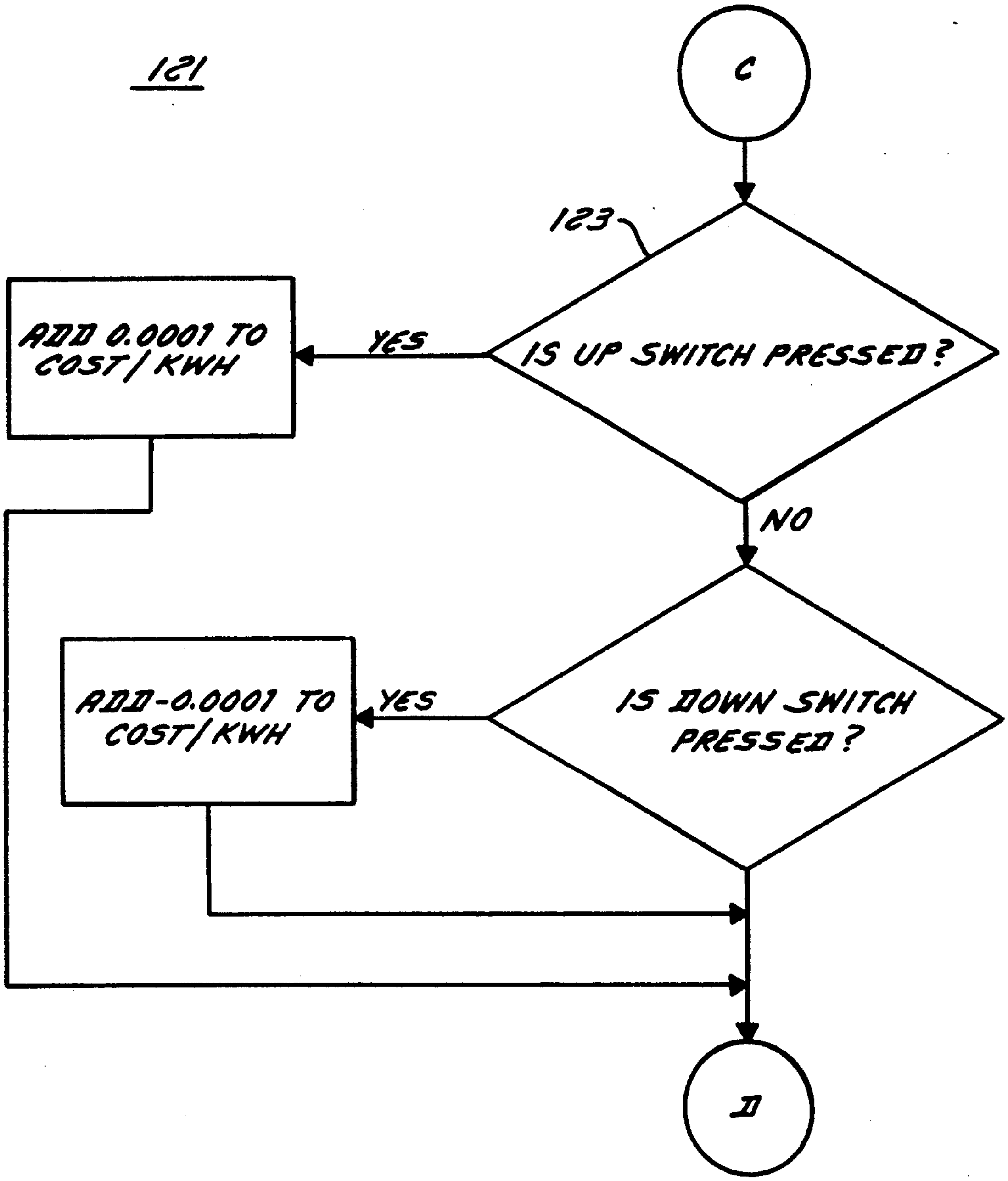
Figure 7:
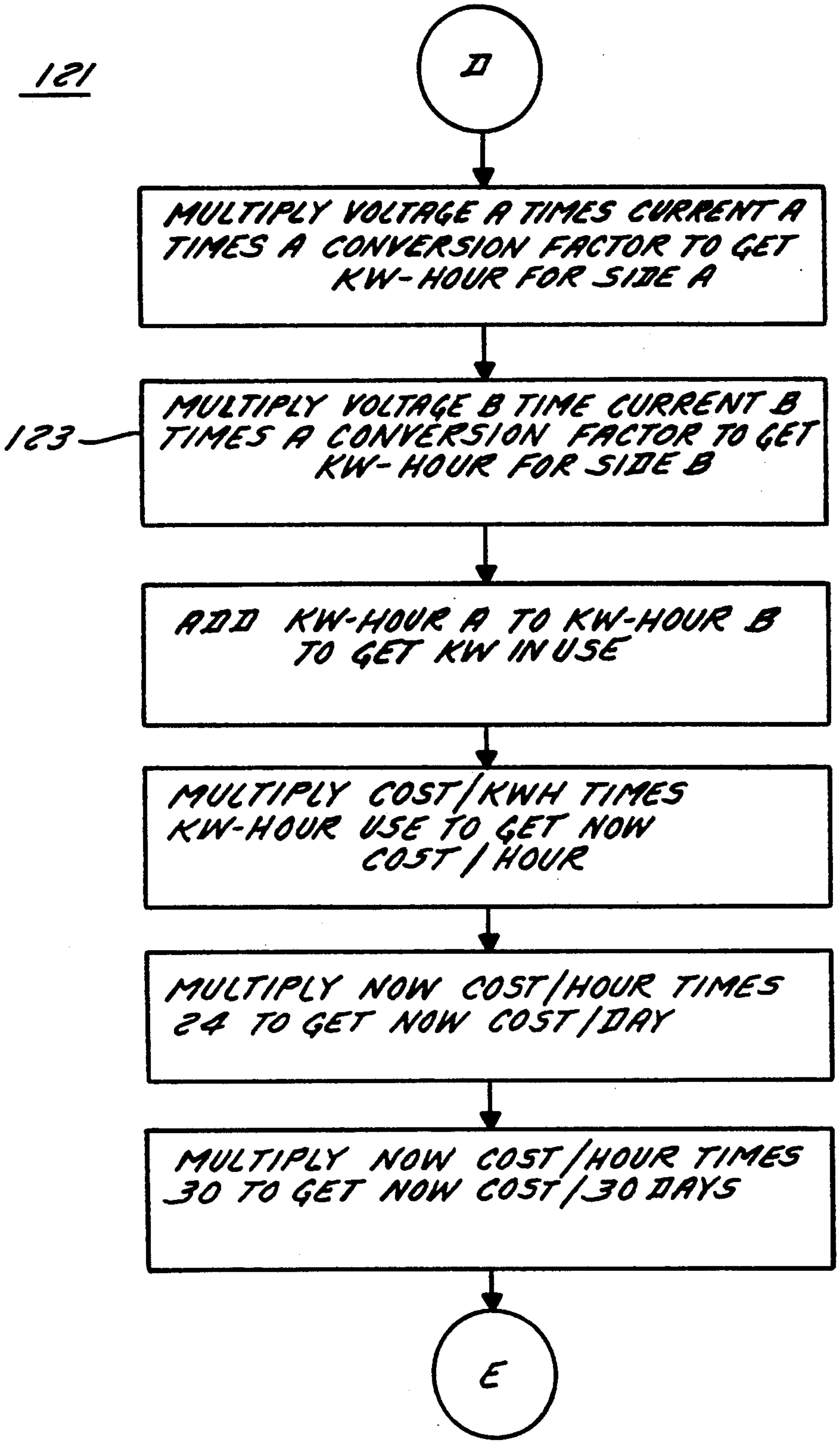
Figure 8:
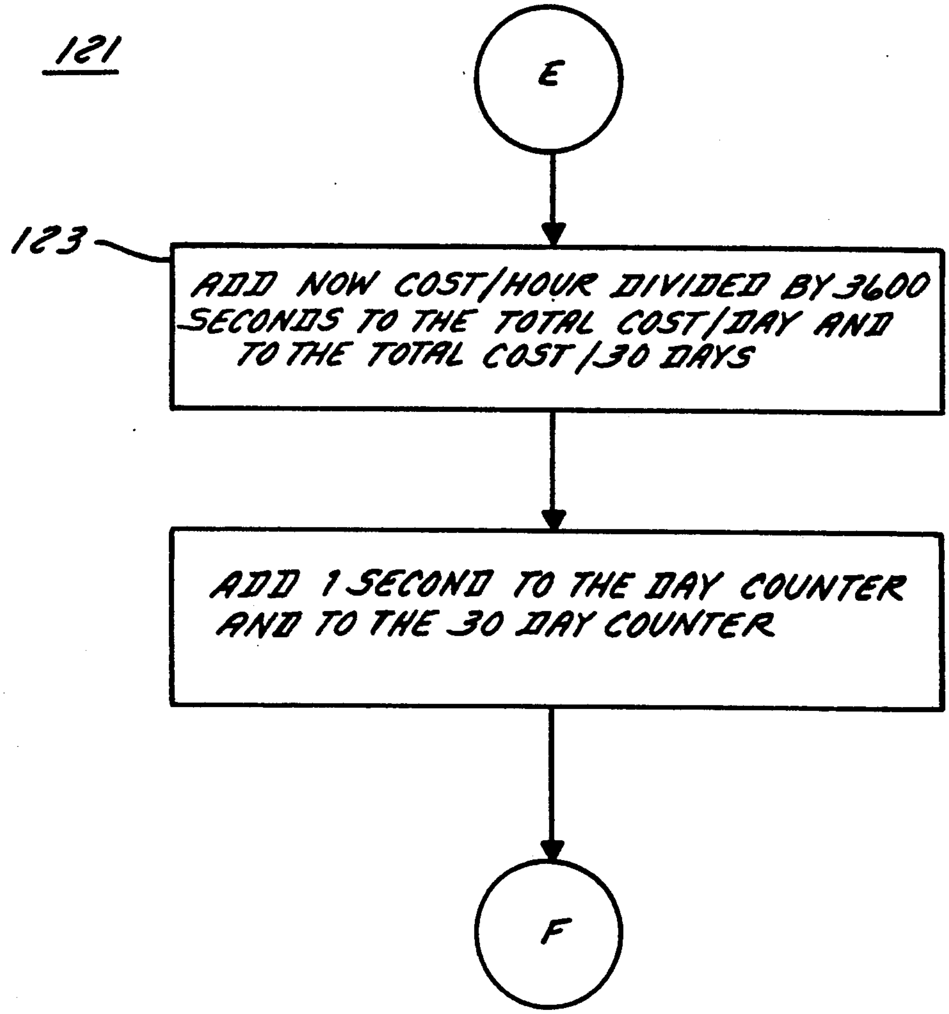
Figure 9:
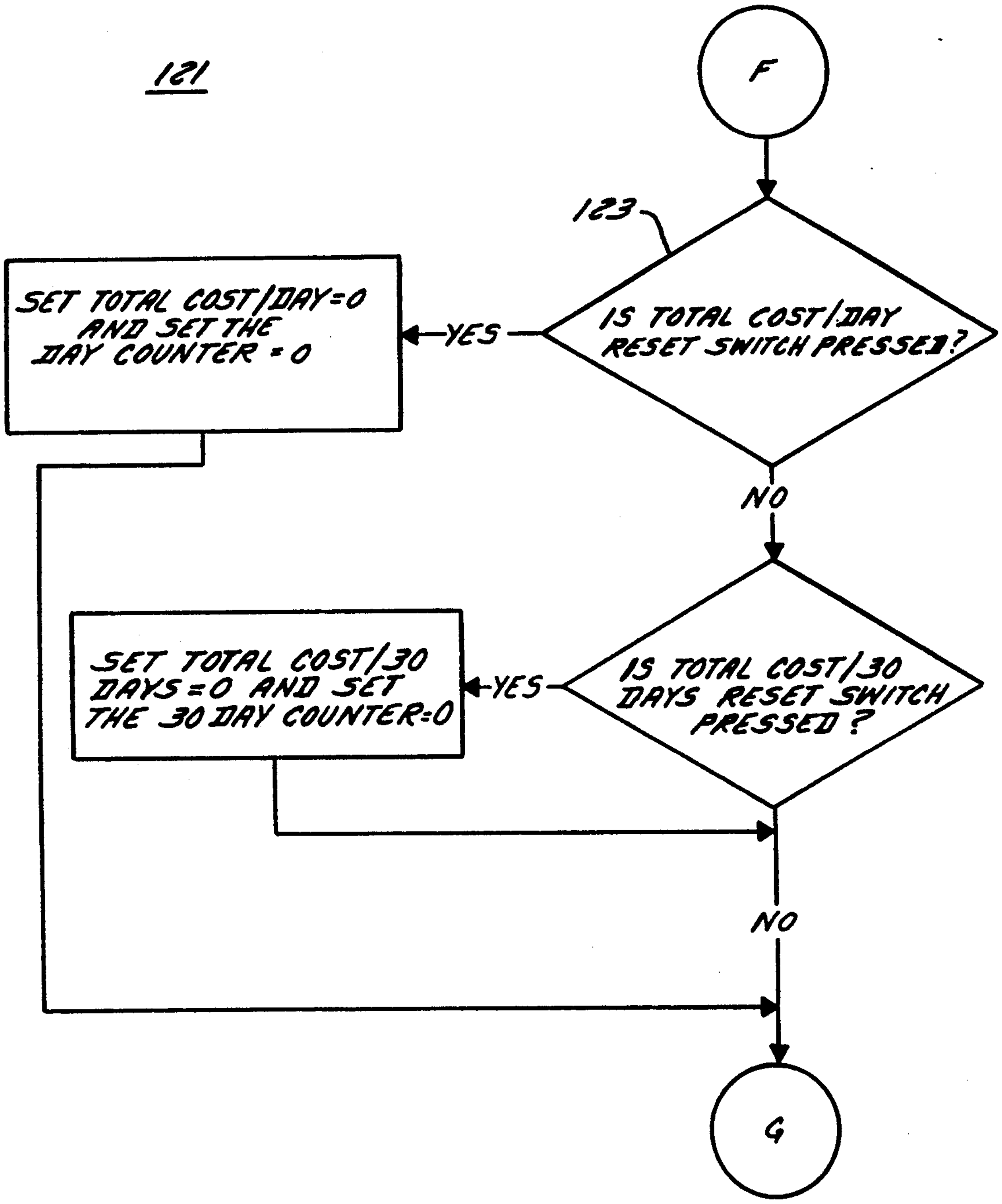
Figure 10:
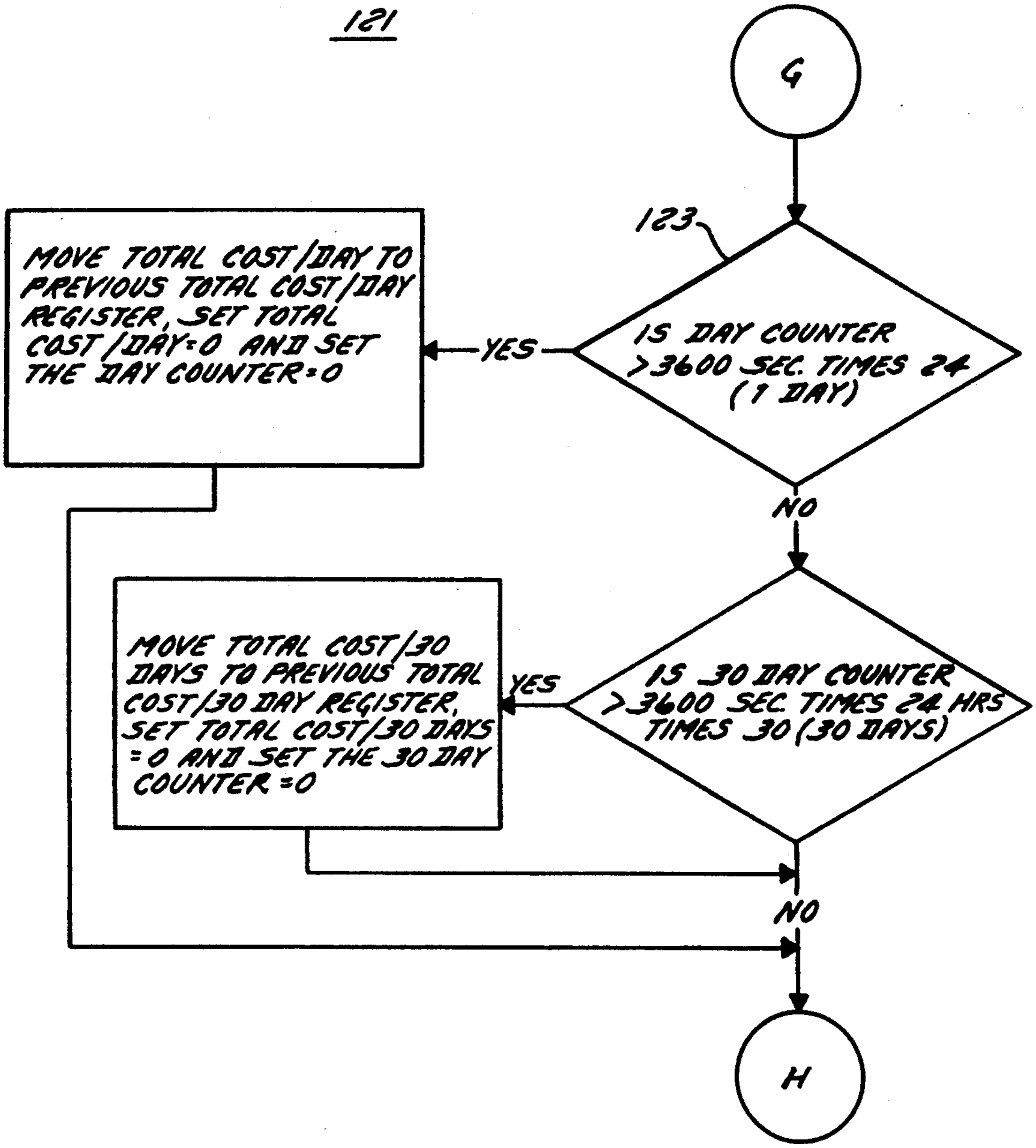
Figure 11:
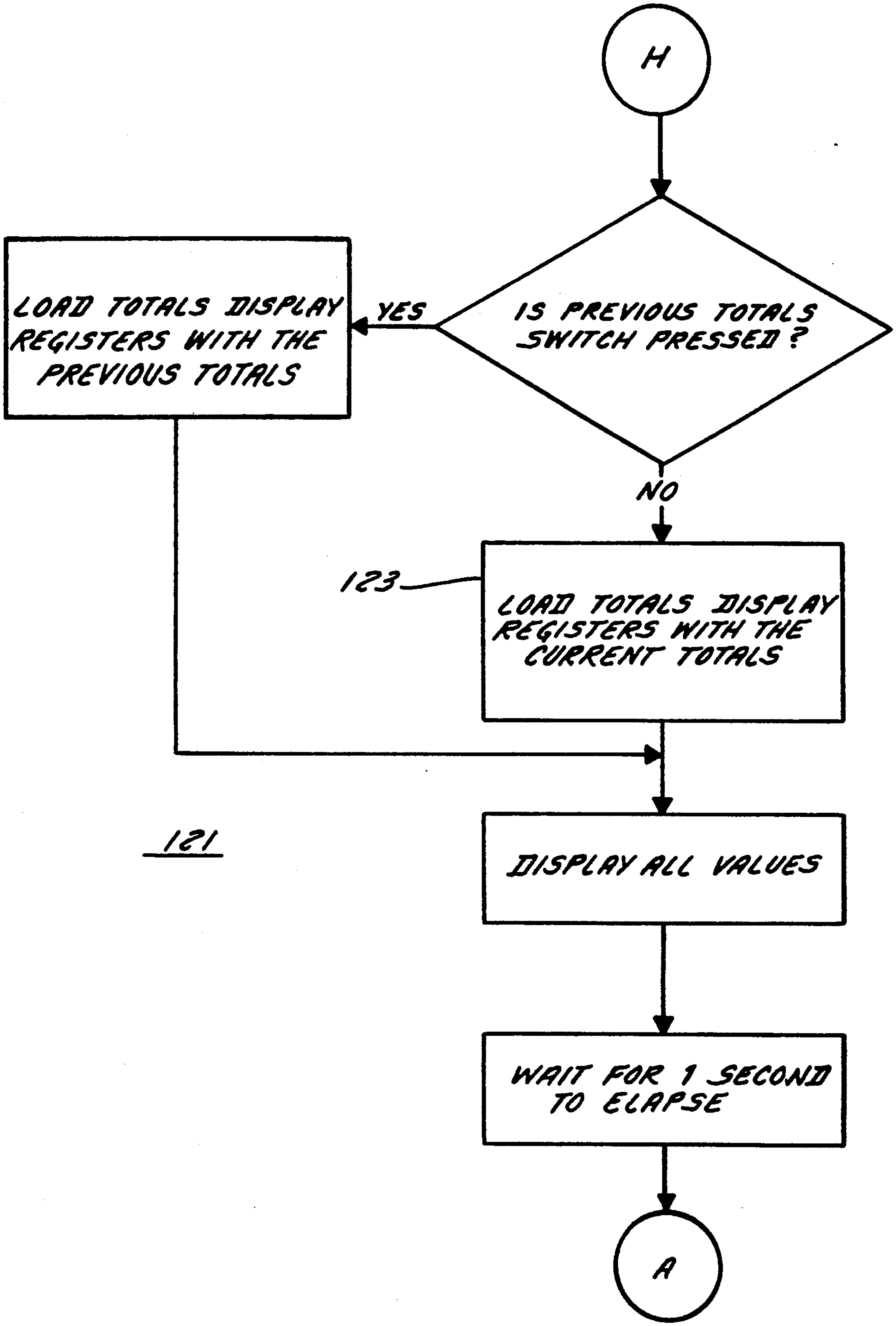

Referring next to FIG. 3, a second embodiment of the device 10 differs only slightly from the first embodiment. In the second or non-multiplexed embodiment, each voltage and current signal has its own dedicated circuitry through the analog to digital converter section 97 or 99, each of which has its own buffer. Information is selected from each analog-to-digital converter 97, 99 in sequence by the microprocessor 95. There may be certain situations where it is more cost effective to measure four inputs (two voltage values and two current values) independently rather than using multiplexers 89, 103 to sequentially direct signals into common circuitry such as the rectification and substraction sections 91, 107 and 93, respectively.

FIGS. 4 through 11 comprise, in sequential numeral FIGURE order, the flow chart 121 of the program 123 executed by the microprocessor 95.

While the principles of this invention have been described in connection with specific embodiments, it should be understood clearly that these descriptions are made only by way of example and are not intended to limit the scope of the invention.

We claim:

1. A device for displaying power consumption rates including:

a register for storing the cost of a unit of power;

a detection circuit which detects power consumption;

a calculating circuit, connected to said register, and to said detection circuit, which calculates the instantaneous rate at which power is being consumed and the cost of power consumed over an elapsed time period and which projects the total costs of power to be consumed over time periods which are presently running but which have not yet elapsed;

a first display, connected to said calculating circuit, for indicating the cost of power consumed over a first, elapsed time period;

a second display, connected to said calculating circuit, for indicating the cost of power projected to be consumed over a second, presently running time period;

a third display, connected to said calculating circuit, for indicating the cost of power projected to be consumed over a third, presently running time period; and a fourth display, connected to said calculating circuit, for indicating the instantaneous rate at which power is being consumed;

the device thereby displaying information relating to the rate and to the actual and projected costs of power consumption.

2. The device of claim 1 wherein the register includes means for changing the cost stored therein of unit of power.

3. The device of claim 2 further including a fifth display, connected to said calculating circuit, for indicating the actual total cost of power consumed thus far during the second time period.

4. The device of claim 3 further including a sixth display, connected to said calculating circuit, for indicating the actual total cost of power consumed thus far during the third time period.

5. The device of claim 4 further including means for resetting the fifth display and the sixth display.

6. The device of claim 5 further including means for causing the display of the actual total cost of power consumed during the immediately preceding second time period and third time period.

7. The device of claim 1 wherein the second time period is multiple of the first time period.

8. The device of claim 2 wherein the third time period is multiple of the second time period.

9. A device for displaying power consumption rates, said device including:

a front panel having a top edge, a bottom edge, a left edge, and a right edge;

a register for storing the cost of a unit of power;

a detection circuit which detects power consumption;

a calculating circuit, connected to said register and to said detection circuit, which calculates the instantaneous rate at which power is being consumed, the cost of power consumed over an elapsed time period, and the accumulated costs of power consumed thus far during time periods which are presently running but which have not yet elapsed, said calculating circuit projecting the total costs of power to be consumed over said time periods which are presently running but which have not yet elapsed;

a first display, connected to said calculating circuit, for indicating the cost of power consumed over a first, elapsed, time period;

a second display, connected to said calculating circuit, for indicating the cost of power projected to be consumed over a second, presently running time period;

a third display, connected to said calculating circuit, for indicating the cost of power projected to be consumed over a third, presently running time period; and a fourth display, connected to said calculating circuit, for indicating the instantaneous rate at which power is being consumed;

a fifth display, connected to said calculating circuit, for indicating the actual accumulated cost of power consumed thus far during the second time period;

a sixth display, connected to said calculating circuit, for indicating the actual accumulated cost of power consumed thus far during the third time period;

the first display, second display and third display being arranged in a first horizontal row;

said first horizontal row being located near the top edge, thereby occupying a position of first viewing when the front panel is visually scanned by a user of the device.

the device thereby displaying information relating to the rate and to the actual and projected costs of power consumption.

10. The device of claim 9 wherein the register is positioned on the front panel at a location separate from the first horizontal row.

11. The device of claim 10 wherein the fourth display, the fifth display and the sixth display are arranged in a second horizontal row, said second row being positioned near the bottom edge.

12. The device of claim 11 wherein the register is located at a position separate from the first row and the second row.

13. A device for displaying the power consumption rates including:

at least one voltage output circuit for providing a signal representing a detected voltage;

a voltage conversion circuit for receiving the detected voltage signal and for providing a digital voltage signal;

at least one current output circuit for providing a signal representing a detected current;

a current conversion circuit for receiving the detected current signal and providing a digital current signal;

a memory circuit which is connected to said voltage conversion circuit and to said current conversion circuit and which stores process variables including a digital voltage signal and a digital current signal;

a display current;

a microprocessing circuit connected to the memory circuit and to the display circuit, said microprocessing circuit receiving the digital voltage signal and the digital current signal, performing computations based on the cost of electrical power, generating output signals, and transmitting the output signal to the display circuit;

a power supply, connected to the circuits, for providing operating power;

the microprocessing circuit and the display circuit calculating and displaying information relating to the rate and to the actual cost of power consumed over an expired time period and the cost of power projected to be consumed over a time period which is presently running but which has not yet elapsed.

14. The device of claim 13 wherein the voltage detected by the voltage output circuit is reduced in the voltage output circuit to a scaled value which is proportional to but smaller than the value of the voltage detected.

15. The device of claim 14 wherein a constant is subtracted from the scaled value in the voltage output circuit, said constant representing the minimum anticipated value of the detected voltage.

16. The device of claim 15 wherein the current detected by the current output circuit is reduce in the current output circuit to a scaled value which is proportional to but smaller than the value of the current detected.

17. A device comprising:

a memory circuit which stores the cost of a unit of power;

a detection circuit which detects power consumption;

a calculating circuit, connected to said memory circuit and to said detection circuit, which projects the cost of power to be consumed over a time period which is presently running but which has not yet elapsed;

a first display device, connected to said calculating circuit, for indicating the cost of power projected to be consumed over said presently running time period.

18. The device according to claim 17, further comprising a second display device, connected to said calculating circuit, for indicating the instantaneous rate at which power is being consumed.

19. The device of claim 18, wherein said calculating circuit calculates the actual accumulated cost of power consumed thus far during said time period, and further comprising a third display device, connected to said calculating circuit, for displaying the actual accumulated cost of power consumed thus far during said time period, said third display device being reset to zero by said calculating circuit upon expiration of said time period.

20. The device of claim 19, further comprising a second register which, at the end of said time period, stores the actual total cost of power consumed during said time period as calculated by said calculating circuit, and a switch which is connected to said third display device and to said second register and which, when activated during a time period immediately following said time period, causes said third display device to display the actual total cost of power consumed during said time period.

21. The device of claim 20, further comprising a switch which is connected to said second register and to said third display device and which, when activated, effectively restarts said time period by causing the then existing accumulated cost of power to be stored in said register and by resetting said third display device to zero.

* * * * *